Dec. 10, 1935.  J. D. RUST ET AL  2,023,491
COTTON PICKING MACHINE
Filed July 1, 1933  10 Sheets-Sheet 1

INVENTORS
John D. Rust and
Mack D. Rust

Dec. 10, 1935. J. D. RUST ET AL 2,023,491
COTTON PICKING MACHINE
Filed July 1, 1933 10 Sheets-Sheet 2

INVENTORS
John D. Rust and
Mack D. Rust

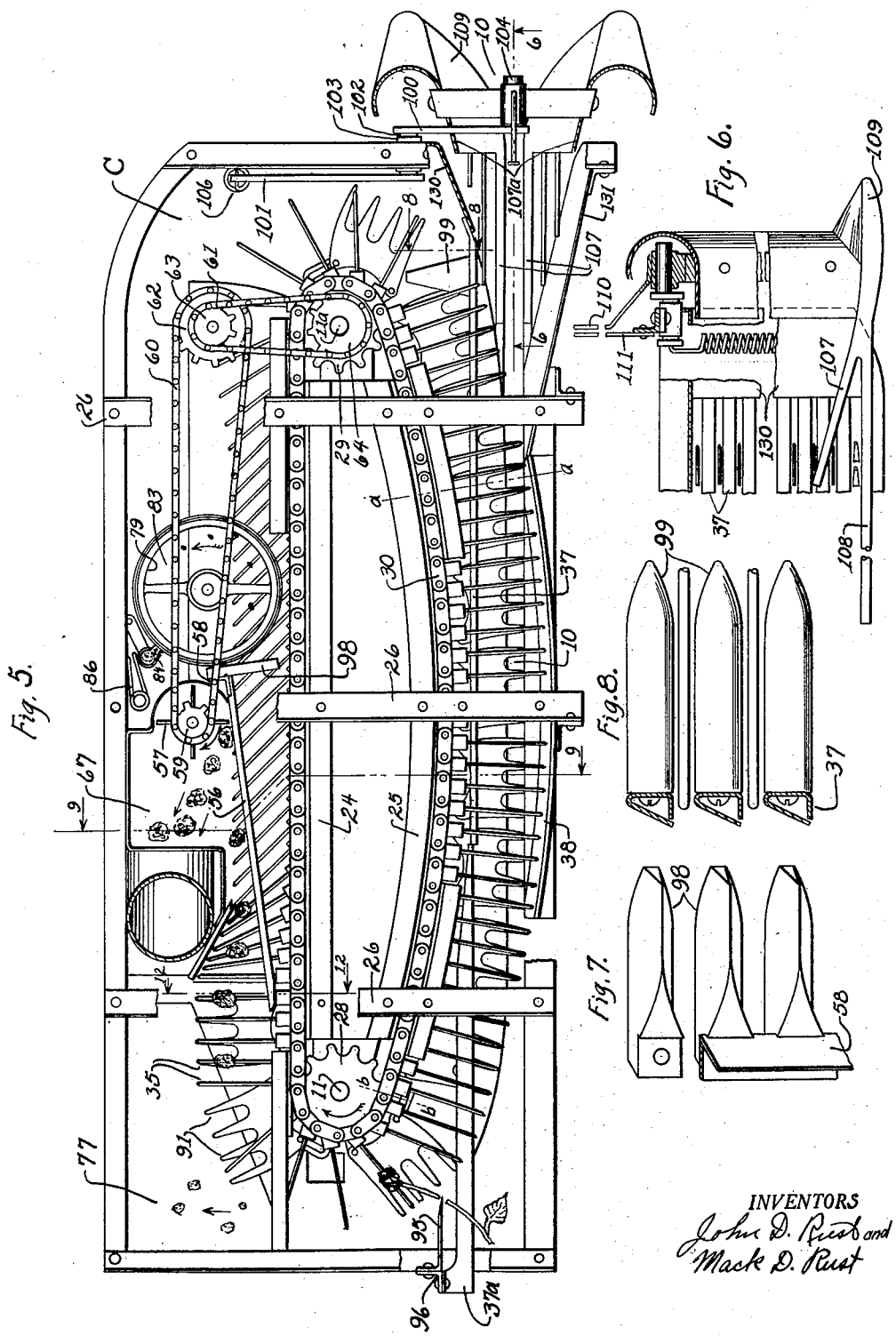

Dec. 10, 1935.  J. D. RUST ET AL  2,023,491
COTTON PICKING MACHINE
Filed July 1, 1933    10 Sheets-Sheet 5

INVENTORS
John D. Rust
Mack D. Rust

Dec. 10, 1935.  J. D. RUST ET AL  2,023,491
COTTON PICKING MACHINE
Filed July 1, 1933   10 Sheets-Sheet 6
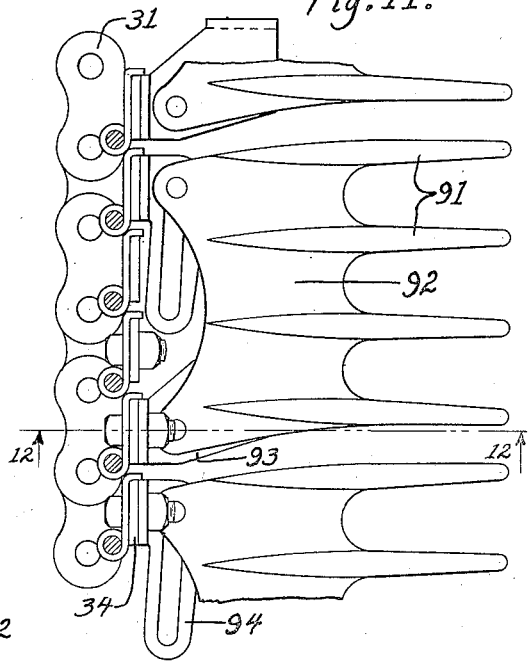
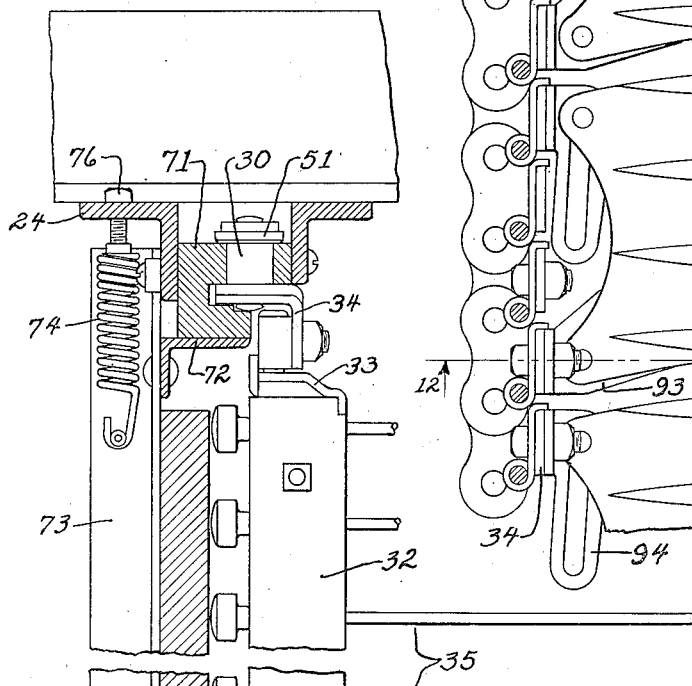
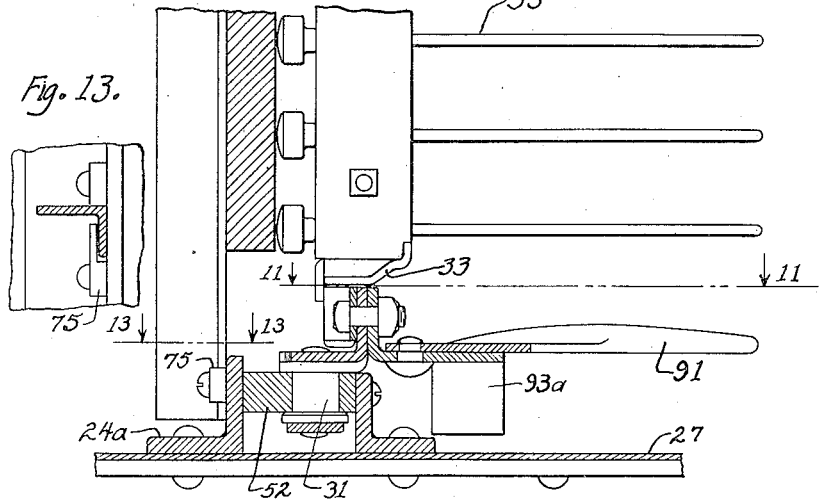
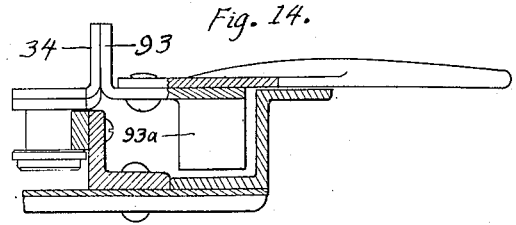
INVENTORS
John D. Rust and
Mack D. Rust Dec. 10, 1935.   J. D. RUST ET AL   2,023,491
COTTON PICKING MACHINE
Filed July 1, 1933   10 Sheets-Sheet 7
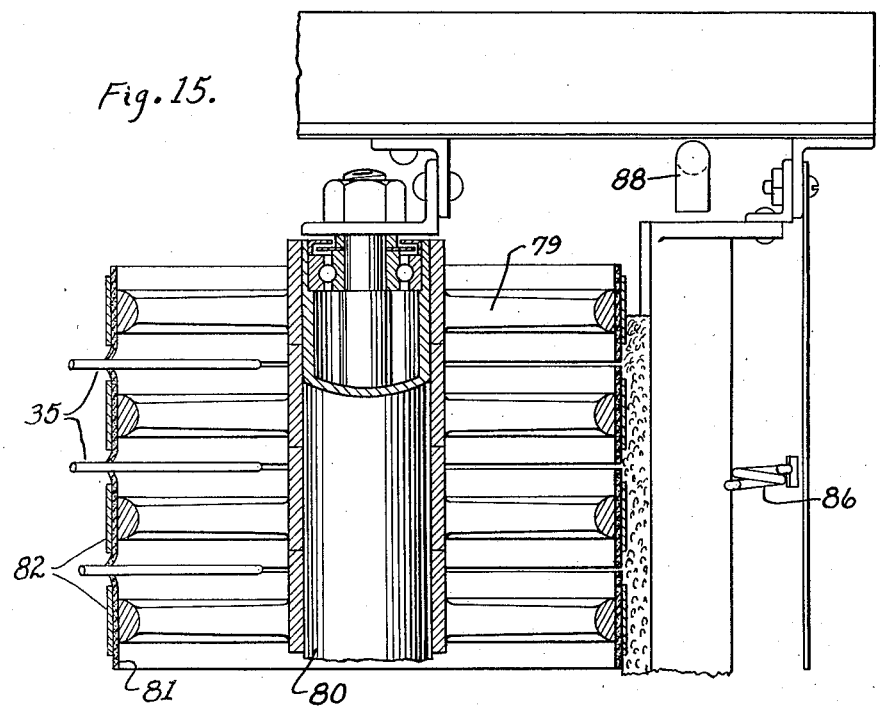
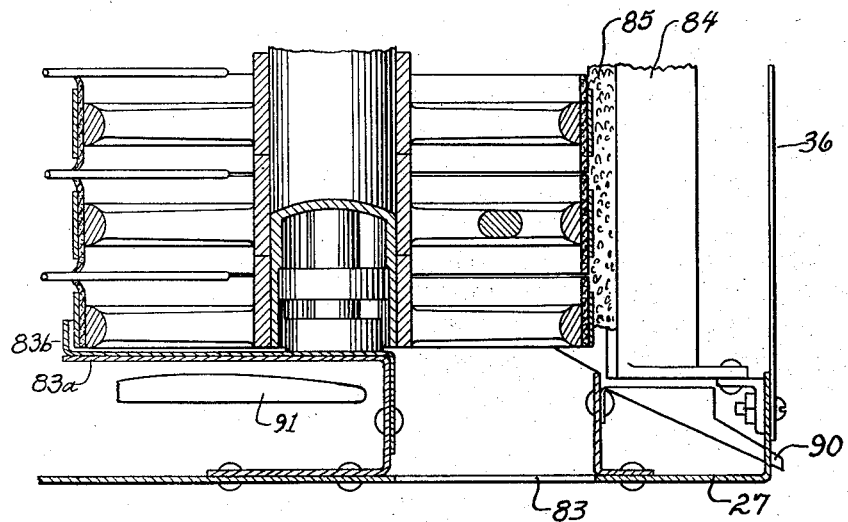
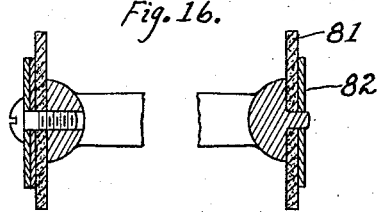
INVENTORS
John D. Rust and
Mack D. Rust Dec. 10, 1935.    J. D. RUST ET AL    2,023,491
COTTON PICKING MACHINE
Filed July 1, 1933    10 Sheets-Sheet 8
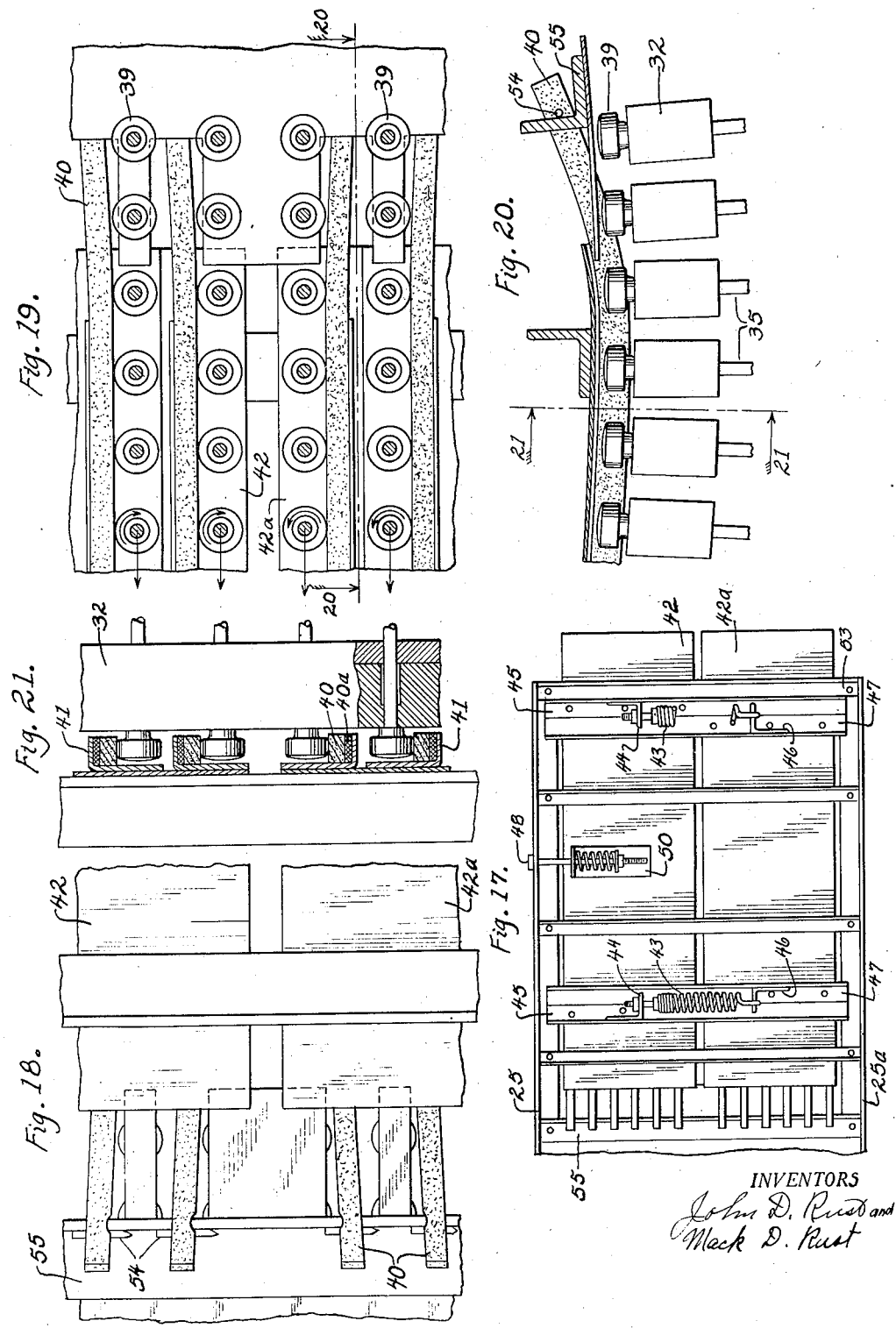
INVENTORS
John D. Rust and
Mack D. Rust

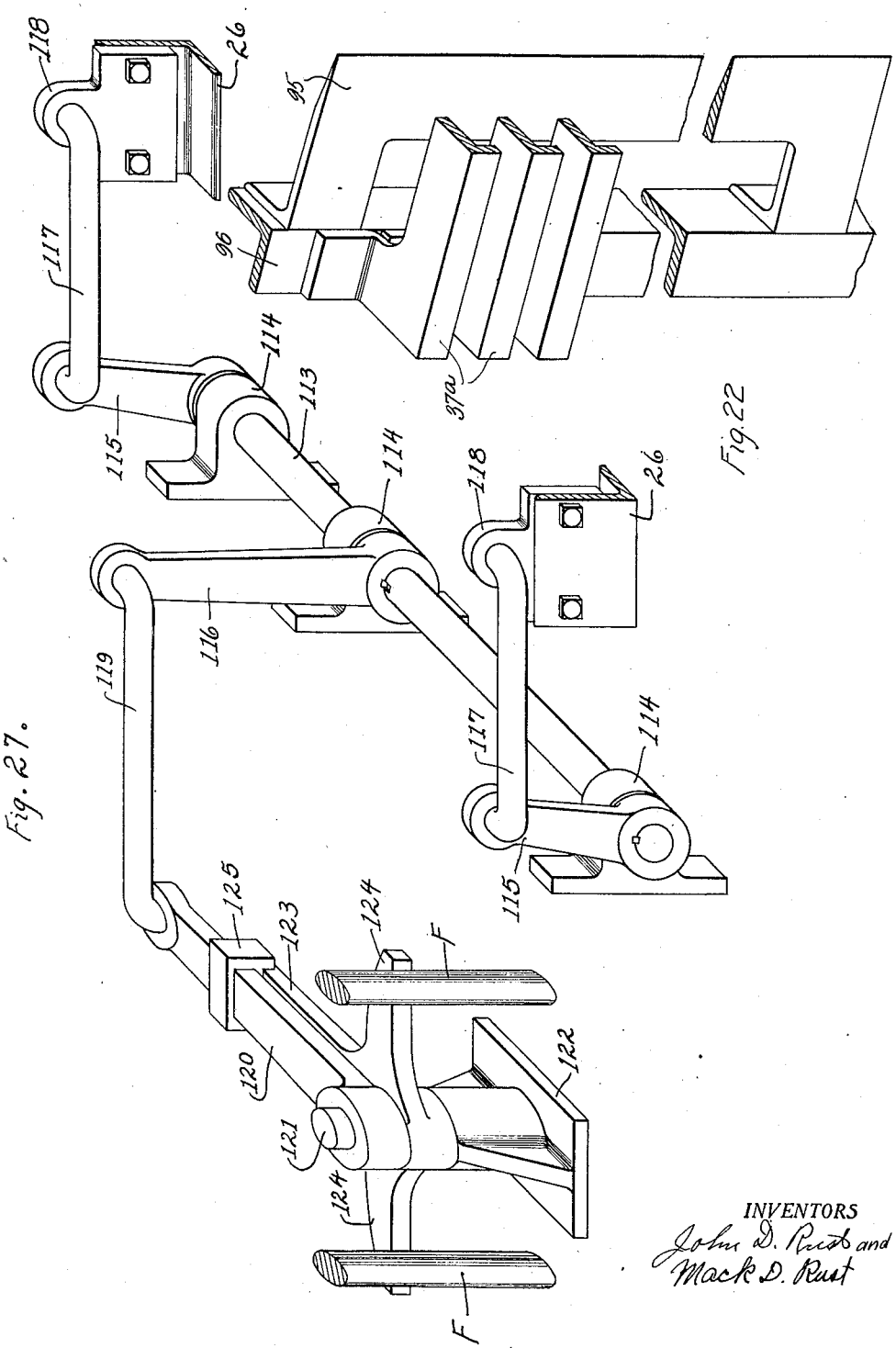

Dec. 10, 1935.  J. D. RUST ET AL  2,023,491
COTTON PICKING MACHINE
Filed July 1, 1933  10 Sheets-Sheet 10
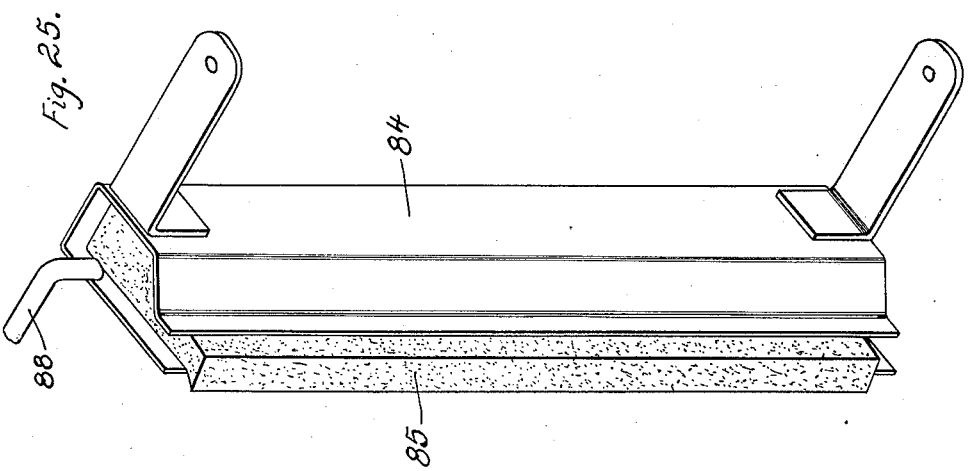
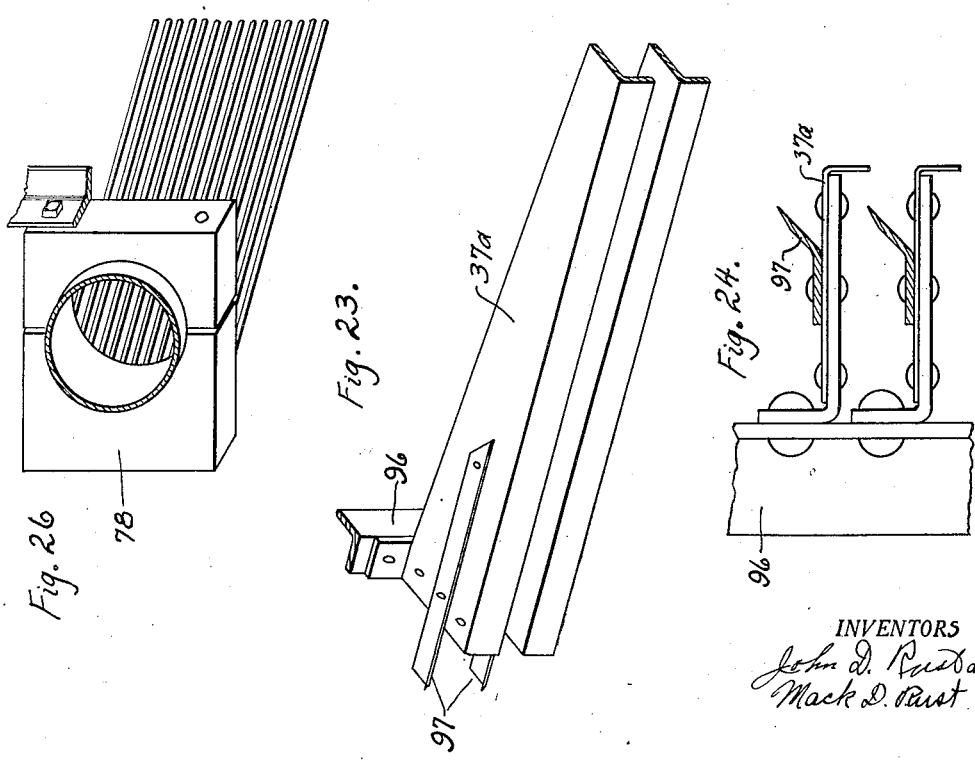
INVENTORS
John D. Rust and
Mack D. Rust Patented Dec. 10, 1935

2,023,491

UNITED STATES PATENT OFFICE 2,023,491

COTTON PICKING MACHINE

John D. Rust and Mack D. Rust,
Lake Providence, La.

Application July 1, 1933, Serial No. 678,670

52 Claims. (Cl. 56—14)

This invention relates to cotton pickers of a type similar to that disclosed in our Patent #1,894,198 granted January 10, 1933, the present invention being an improvement over that forming the subject matter of an application filed by the present applicants on April 21, 1931, Serial #531,812.

A cotton picking machine such as referred to above may include a pair of housings within each of which is the necessary mechanism for picking the cotton from a row of plants. These housings or picking units may be mounted and powered in any suitable manner, but our preferred embodiment consists of a pair of picking units being mounted on a track type of tractor, one unit on each side thereof.

Each housing has a longitudinal passage at one side thereof to receive the plant row, and contains the picking spindles rotatably mounted in and carried by an endless spindle carrier which travels in a longitudinally elongated path that bulges toward the plants of the row being picked. Through the horizontal spaces between the stalk guards, which form one wall of the housing, the spindles project into and across the plant receiving passage. The motion of the spindle carrier, due to the shape of the path it follows, causes the spindles uniformly to penetrate the plants for the picking operation and to be gradually withdrawn therefrom as the picking is finished.

Rotation of the picking spindles while in contact with the plants is effected, incident to the movement of the endless spindle carrier, by means of frictional racks which engage rollers on the inner ends of the spindles.

Moisture, preferably water, which is automatically applied to the surfaces of the smooth spindles prior to their contact with the plants, causes the fibers of the open cotton bolls to adhere thereto and to become wound about the spindles as they rotate.

Opposite the picking side of the elongated path of the spindle carrier, are provided stripping means for removing from the spindles the cotton collected thereon, and suitable means for conveying this cotton to a receptacle from which it may be discharged at convenient intervals.

The speed of travel of the spindle carrier, and the consequent movement of the spindles in the backward direction during contact with the plants, is approximately equal to the speed of the forward travel of the machine whereby the spindles, while in the plants, rotate in a position approximately stationary with relation to the plants.

Field experience with a cotton picking machine such as shown in our application Serial No. 531,812, has proved the mechanism described therein to be very effective in the main; but machines of this type have been subject to certain difficulties that have interfered with their continuous operation. One of these has been the bending of spindles due either to the occasional slipping of the traction wheels or to the presence in the field of tough wiry vines which sometimes become entangled with the cotton wound upon a spindle and cause the spindle to be bent as it passes in its path from the picking position to the stripping side of the machine. There is also a tendency for small wisps of cotton to accumulate on the spindles. An important object of our present invention, therefore, is to provide efficient means for removing the small wisps from the spindles; and this is accomplished by providing an auxiliary doffing device which in its preferred embodiment consists of a series of doffing wheels with flexible bands over the rims thereof, which extend laterally between the horizontal rows of spindles, and which in parting contact with the spindles drag off the small wisps left thereon by the stripping mechanism. In practice this device has proved very effective and so far as we know are the first to propose or use an auxiliary doffer of any type in combination with a cotton picking machine.

Another very important object is to provide simple and effective means for applying liquid, preferably water, to the surface of the flexible bands of the auxiliary doffer wheels; this liquid serving a two-fold purpose, that of lubricating the surfaces of the flexible bands to prevent wear, and at the same time providing a most effective means for moistening the spindles to cause the adherence of the cotton thereto during the picking operation. Applying liquid to cotton picking spindles for various purposes is old in the art but we believe we are the first to combine a moistening device with a doffer.

Another object is to provide means for guiding the spindles into proper contact with the auxiliary doffer, after they pass the stripping mechanism. The general idea of guiding spindles is disclosed in our Patent No. 1,894,198 dated January 10, 1933, but the present combination of spindle guides and doffing means is believed to be novel.

Another important object is to provide means for preventing spindle bending due to slippage of the traction wheels, said means comprising a system of spindle guards carried by the lower spindle carrier chain, which guards, being stronger than the cotton stalks encountered, protect the relatively slender spindles from abuse when slipping of the traction means occurs. So far as we know, we are the first to propose any device for this purpose.

Another object is to provide means for preventing spindle bending due to entanglement with vines, and the like, said means comprising one or more cutting elements shaped and mounted in such manner that the vines entangled with any spindle will be pulled against and severed by a cutting element. Experience has proved this device to be very effective and so far as we are informed no one else has ever used or proposed a device for this purpose.

Another object is to provide improved stalk guards designed to shed cotton and falling dirt away from the spindle bearings.

Another object is to provide suitable retaining means whereby the spindle drive friction rail elements may be held at a single point, thus facilitating quick and easy replacement. Experience has proved the efficiency of this device and it is believed that this feature is entirely new in the art.

Another object is to provide flexible friction drive elements for rotating the spindles, said drive elements consisting of rubber composition or the like and having constructed integrally therewith such additional elements as may be required to provide the necessary tensile strength and resistance to excessive stretching. A cushion element with a non stretching characteristic is essential for the type of drive shown in the drawings of this application and it is believed that this feature is new in the art.

Another object is to provide self-adjusting means for supporting the weight of the traveling spindle carrier thru that portion of its path on the stripping side of the machine. This device is an improvement over the means shown in our application No. 531,812 filed April 21, 1931, and the novelty resides primarily in the self-adjusting feature.

Another object is to provide a suitable opening in the housing for the discharge of any trash or foreign matter that may be thrown from the spindles before they reach the point at which the cotton is removed therefrom by the stripping mechanism. It is essential to have a weather proof housing over the spindles and other mechanism of a cotton picking machine but it is also essential to have an opening in the housing through which the trash may be discharged from the spindles. We have provided this opening in the floor of our machine and the novelty resides in providing the necessary opening at the proper location without exposing the mechanism to the weather.

Another object is to provide for the plant receiving passage an outer wall so constructed as to insure complete penetration of the plants by the spindles and at the same time prevent clogging of the plant passage by pieces of old cotton stalks or the like. This new outer wall or stalk shield combines the features of the shield shown in Figure 6 of our Patent No. 1,894,198 issued January 10, 1933, and the shield shown in Figure 1 in the patent to John Daniel Rust, No. 1,910,307 dated May 23, 1933. Our experience with a shield of the type disclosed in the first named patent proved the fins therein illustrated to be highly satisfactory for pressing the cotton into the spindles, but owing to the narrow space between the fins and the comparatively great depth of same, it was found that sometimes pieces of old stalks and the like would become wedged between the fins and cause bending of the spindles. The novelty of the present shield resides in the structure being such that it will force the cotton into and past the free ends of the spindles preventing the fibers from being twisted between the ends thereof and at the same time having the spaces between the fins on the shield sufficiently shallow and wide enough to permit any dead stalks and the like to pass through without lodging between the fins.

Another important object is to provide a self-propelled cotton picker whereby cotton picking units are mounted on either side of a track type tractor thus providing a most positive traction means, this being very essential to a spindle type cotton picker which must be timed as nearly as possible with the speed of the tractor. In a spindle type machine any slipping of the traction means will likely result in bending of spindles or abusing cotton plants. On a wheel tractor such slippage is more likely to occur than on a tractor equipped with tracks. The tracks are better adapted than wheels for traveling over wet or sandy ground. We are aware that the track type of tractor has long been in use, but it is believed that we are the first to propose a track laying machine in combination with a cotton picker. A two row machine as herein illustrated is our preferred embodiment of this invention but we wish it to be understood that a self-propelled one row machine of the same general characteristics may be had, without departing from the spirit of this invention, by simply omitting one of the units and substituting therefor suitable counter-balancing weights or the like.

Another object is to provide a mounting whereby the picking units are laterally movable so that said picking units will freely follow the cotton rows to a certain extent independently of the course of the tractor or other carrying structure on which one or more picking units may be mounted. By this means the driving of the tractor or draft animals becomes less arduous as the driver is not required to drive the machine so accurately as would be the case where the picker is fastened rigidly to the tractor or other carrying structure. Furthermore, this freely floating picking unit provides a very satisfactory means for connecting a self-steering device with the tractor. We regard this manner of mounting a cotton picker as a valuable contribution to the art and so far as we know it has not heretofore been used or proposed.

Another object is to provide a floating device for gathering in the limbs and for raising the lower cotton bolls to insure their contact with the spindles. The novelty of this device resides principally in the fact that it will follow the row and ride the ground to some extent independently of the position of the cotton picking machine. By this means, even if the cotton picker is not driven exactly on the center of the row, the boll gathering device will swing slightly to one side or the other raising the lower bolls up to the spindles and gathering the limbs into the plant receiving passage and at the same time providing a convenient means for attaching a row indicating device which in practice we have combined with it.

Another object is to provide a row indicating device which in operation will indicate to the driver when the machine is being steered too far to the right or to the left of the course it should follow on the rows. Our present machine has an indicating device of this type combined with the floating boll gathering device referred to above. This is our preferred embodiment but it is obvious that an indicating device might be made independent of the boll gathering device. As far as we know, we are the first to use or propose a device of this nature.

Another object is to provide means for connecting the steering apparatus of the tractor with either or both of the picking units in such a way that the picking units, while freely following the cotton rows, will automatically steer the tractor in its proper course. We are aware that self steering mechanism has been proposed for corn harvesting machines and the like but it is believed the novelty of our structure will be apparent from the specifications and appended claims. While we consider automatic steering to be highly desirable in a machine of this type, we wish it to be understood that this machine may be used with or without the automatic steering device.

Another object is to provide suction means for picking up cotton that may be on the ground and discharging it into a separate container, such means permitting salvaging of the cotton on the ground simultaneously with the picking operation and without mixing the salvaged cotton with the clean cotton picked from the stalk.

This invention also consists of certain other features of construction and of the combination and arrangement of the several parts, to be hereinafter fully described, illustrated in the accompanying drawings and specifically pointed out in the appended claims.

In describing the invention in detail reference will be had to the accompanying drawings wherein like character denotes like or corresponding parts throughout the several views, and in which:—

Figure 5 is a plan view of a picking unit with covers omitted and parts removed or cut away to shown features of the present invention.

Figure 6 is a fragmentary view taken on line 6—6 of Figure 5 to show details of boll gatherer and row indicating device.

Figure 7 is a fragmentary detail view of the spindle guide elements positioned adjacent the auxiliary doffer for guiding spindles into same.

Figure 8 is a fragmentary view taken on line 8—8 of Figure 5 to show details of spindle guide elements.

Figure 11 is a fragmentary internal view looking downwardly on a portion of the lower spindle carrier chain and the attached spindle guard elements, this view being taken at the rear on the stripping side of the picking unit.

Figure 12 is a fragmentary view in partial section taken on line 12—12 of Figure 5.

Figure 13 is a fragmentary view looking downwardly taken on line 13—13 of Figure 12.

Figure 14 is a fragmentary view in partial section showing spindle guard and a guide element which works in conjunction therewith.

Figure 15 is a vertical sectional view taken thru the auxiliary doffer locking rearwardly.

Figure 16 is an enlarged cross sectional view showing means by which the flexible bands are held to the rims of the doffing wheels.

Figure 17 is an internal fragmentary view looking outwardly showing the general structure of the spindle drive means.

Figure 18 is a fragmentary view on enlarged scale, looking outwardly, showing a portion of spindle drive elements at the point of engagement of the spindle rollers therewith.

Figure 19 is a fragmentary view looking inwardly and corresponding to the view of Figure 18 taken in the opposite direction.

Figure 20 is a horizontal section taken on line 20—20 of Figure 19 showing details of means for retaining the resilient drive rails against longitudinal displacement.

Figure 21 is a vertical section taken on line 21—21 of Figure 20.

Figure 22 is a perspective view showing rear portions of stalk guard elements and the vine cutting element adjacent thereto.

Figure 23 is a fragmentary perspective view showing rear portions of stalk guards and an alternate form of vine cutting elements attached thereto.

Figure 24 is a vertical sectional view taken thru the extended portion of the line cutting elements illustrated in Figure 23.

Figure 25 is a perspective view showing moistening device used to apply moisture to the surface of the auxiliary doffing wheels.

Figure 26 is a perspective view of the cotton discharge head, view taken looking downwardly from above.

Figure 27 is a view in perspective of the elements comprising the automatic steering device.

In these drawings, the letter A indicates a tractor and B indicates a frame supported by the tractor. A pair of cotton picking units C, each of which contains complete mechanism for picking the cotton from a row of plants, is carried by the frame B, one at each side of the tractor, so that as the tractor travels along astraddle of a row of cotton plants, the units will pick the cotton from the rows adjacent thereto.

Figure 1:
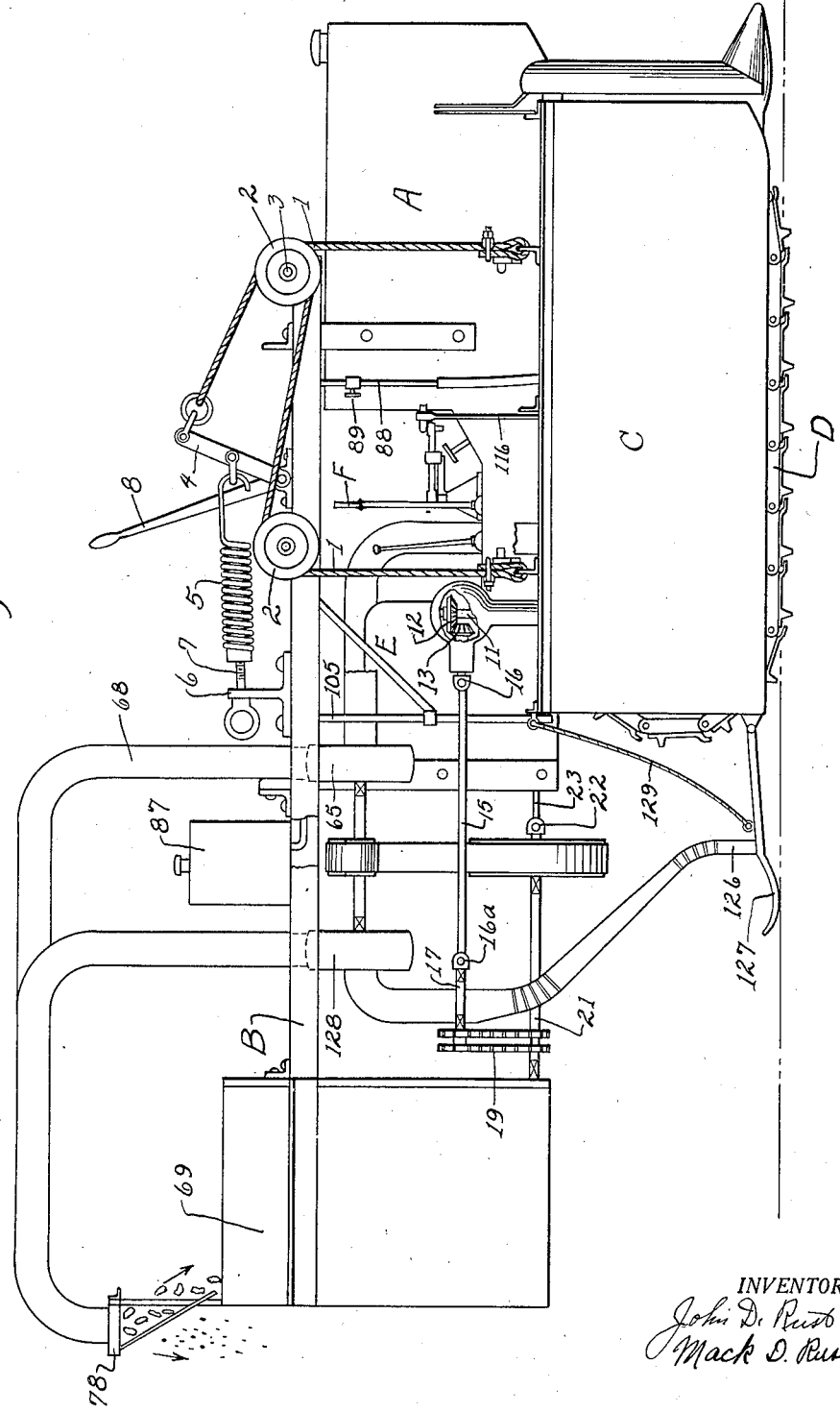
Figure 1 is a side elevation of the complete invention.
Figure 2:
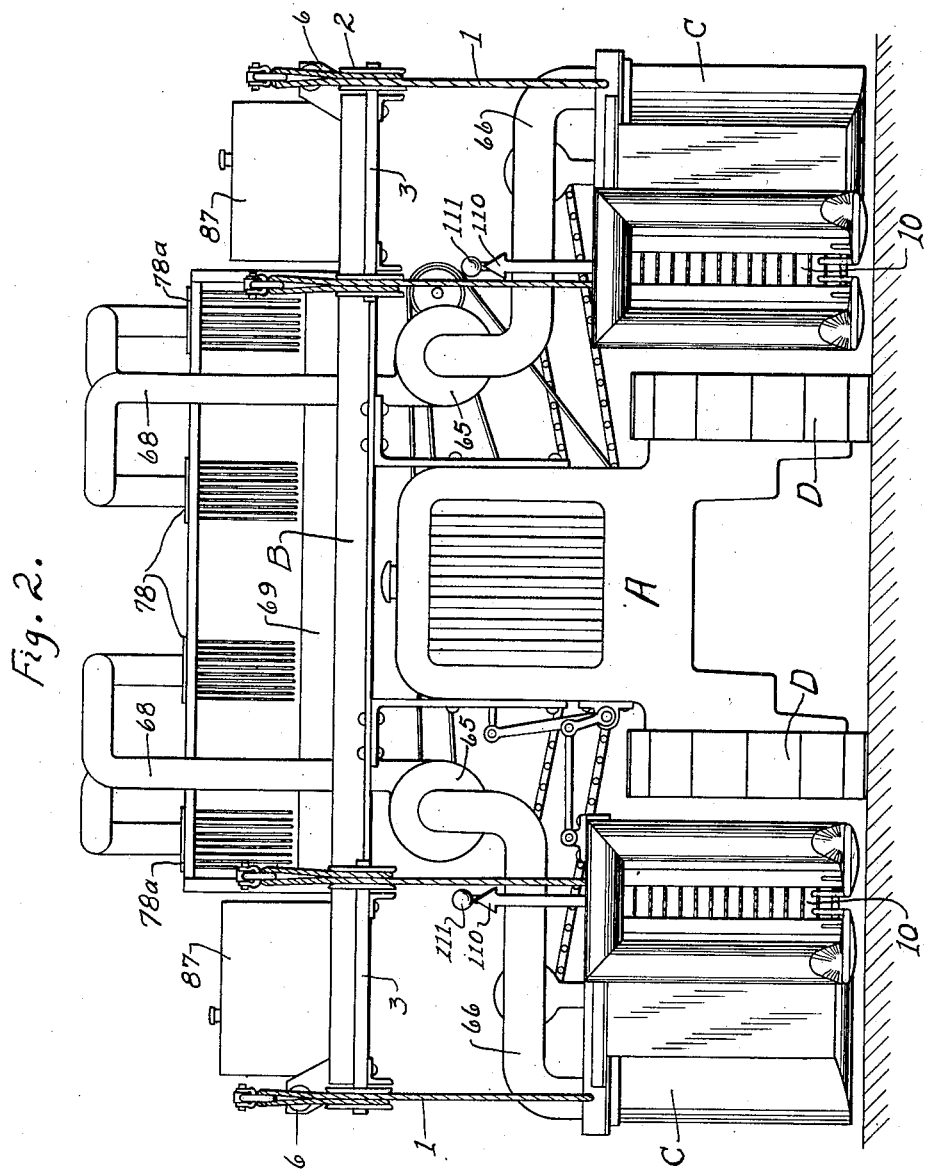
Figure 2 is a front elevation thereof.

Referring to Figures 1 and 2, the housings C, otherwise referred to as picking units, are supported by cables 1 passing over sheaves 2 carried on shafts 3 rigidly secured to the supporting frame B. The upper ends of these cables attach to the arms 4 to which are attached from the opposite direction, the springs 5 held at their opposite ends by the brackets 6 and the adjusting screws 7. The weight of the picking units is, by this arrangement, supported and counterbalanced by the springs 5, and manual control for lowering or raising the units is provided by means of a suitable lever 8 secured to the shaft 9 which is journaled in the supporting frame B and which carries the aforementioned arms 4.

It will be noted further that each picking unit is provided with an opening 10 at one side thereof for receiving the plant row, said opening being on the side of the unit nearest the tractor, whereby the units may be considered as formed in pairs having symmetrical right and left hand characteristics. Under ordinary field conditions where the spacing of the rows is generally about three to three and one-half feet apart, the tractor, as we have shown, would straddle one row and the adjacent row on each side thereof would be picked by the right hand and left hand units respectively. The clearance under the center of the tractor is sufficient that no damage occurs to the plants or the open cotton of the row straddled by the tractor.

Power for driving the picking mechanism is applied to the shaft 11 by means of the bevel gear 12 at the upper end thereof, engaging the bevel gear 13 on the shaft 14 which is connected by means of the shaft 15 and universal joints 16 and 16a to the shaft 17 on the opposite end of which is secured the sprocket 18 connected by means of the chain 19 with the sprocket 20 on the shaft 21 having its forward end connected by means of the coupling 22 to the power-take-off shaft 23 projecting rearwardly from the transmission set of the tractor.

A conventional type of spline joint (not illustrated in drawings) forms a part of the connection between universal joint 16a and the shaft 15, thus permitting the slight variation of the length thereof which necessarily occurs when the picking unit is raised to its high position.

Since the particular tractor shown is a standard commercial product and within itself contains no part of our present invention, it is therefore illustrated but briefly in the drawings. The tractor A is provided with a conventional type of power plant and includes tracks D, the operators seat E and the steering controls F within comfortable reach of the operator. Other controls generally provided conventionally for such machines may be assumed included but not illustrated in detail. While the track type of tractor with high clearance, shown herein, is believed to possess certain decided advantages over the wheel type tractor for use with cotton picking machines, it is to be understood, never-the-less, that we do not wish to limit the use of our invention to this type of tractor. It is to be noted, in fact, that one or more picking units such as referred to above may be mounted and carried in any suitable manner and propelled either by engine power or draft animals according to the particular conditions of locality or other factors which may affect such choice of mounting and propulsion.

Attention is called now to the particular construction of the picking units C, one of which is illustrated in Figure 5. A main frame including the longitudinally extending inner frame indicated generally at 24 and 25, the cross members 26 of the upper frame joined thereto, and the floor 27 at the bottom of the said inner frame provide support for the working parts of the picking apparatus. At the ends of the inner frame are journaled the front and rear vertical shafts 11 and 11a, respectively, having at the upper and lower ends thereof the sprockets 28 and 29 around which pass the upper and lower chains 30 and 31 (see Figures 9, 11 and 12a. These chains, together with the series of vertically arranged slats 32 pivotally attached by means of the hinge elements 33 at their ends to lugs 34 formed as extensions on the links of the aforesaid chains, form an endless belt or carrier for the spindles 35 which are journaled for rotation in the slats 32. This spindle carrier as a whole moves in the elongated path indicated, and the functions of winding the open cotton from the plants onto the rotating spindles, and the subsequent removal of the cotton from the spindles occurs incident to the travel of the spindle carrier as will be more fully explained presently.

A housing enclosing the working parts consists primarily of the bottom plate 27, the outer side wall 36 (upper covers omitted in the present application but shown and described in our application No. 531,812 filed April 21, 1931) and the longitudinal elements 37 forming a horizontally slotted inner wall between the picking mechanism and the row of plants to be picked and another wall 38 co-acting with the said inner wall serves to form a plant receiving passage, otherwise referred to herein as the picking tunnel. As the front end of this tunnel the walls diverge forming a mouth to gather in the plants as the machine travels along the row. As will be seen by reference to Figures 5 and 9, the spindles 35 project thru the horizontal spaces of the inner wall into and entirely across the picking tunnel at certain portions thereof. Further, the bowed shape of the endless spindle carrier path on the picking side of the inner frame provides for the gradual penetration of the spindles thru the plants as they enter, and for the gradual withdrawal of the spindles therefrom as they leave the picking tunnel. As noted above, the speed of the spindle carrier, and the consequent movement of the spindles in the backward direction, is approximately equal to the speed of the forward travel of the machine, whereby the spindles rotate while in the plants in a position approximately stationary with relation to the plants.

Rotation of the spindles while in the picking space is produced by friction between the rollers 39 on the inner ends of the spindles 35 and the resilient friction rails 40, the latter being retained laterally, and having pressure vertically applied thereto by means of the flanged elements 41 carried by the curved plates 42 and 42a and extending longitudinally the full length thereof (see Figures 18, 19, 20 and 21). By reference, especially to Figures 19 and 20, it will be seen that the rotation of the spindles occurs incident to the movement of the spindle carrier moving with the spindle rollers in contact with the stationary friction rails 40. The upper and lower curved plates 42 and 42a positioned adjacent and parallel to the curved path of the spindle carrier and extending approximately from a—a to b—b, (see Figure 5) are held yieldingly toward each other by means of the springs 43 connecting between brackets 44 on angle bars 45 attached at their upper ends to the upper curved plate 42 and the brackets 46 on the angle bars 47 attached at their lower ends to the lower curved plate 42a, thus forming a complete spindle drive unit, the weight of which as a whole may be suspended by any suitable means such as the bolt 48 connecting between the upper frame member 25 and a bracket 50 secured to the curved plate 42.

It is to be noted here that the spindle driving device just described is utilized for the further purpose of supporting the weight of that portion of the endless spindle carrier adjacent thereto, which in its practical effect includes all of that portion of the carrier on the picking side, although the actual contact of the spindle rollers with the driving members does not begin until they reach approximately the line a—a of Figure 5. Having thus relieved the spindle carrier chains of carrying any appreciable amount of weight, which if carried by the chains would cause the side plates 51 of the chains to drag heavily against the top surfaces of the chain guide rails 52 (see Figure 9), any undue wear between these parts is therefore eliminated. Vertical adjustment is effected by means of the adjusting screw 48. End movement of the spindle drive element is prevented by means of the contact between angle bar 45 and angle bar 53 shown in Figure 17.

Referring to Figures 18, 20, and 21, the friction rails 40 have fabric inserts 40a made integrally therewith and extending the full length of the rails, thereby providing the tensile strength and the resistance to stretching necessary to permit retaining the rails against longitudinal displacement by holding at a single point at the front end thereof.

The rails 40 have pins 54 inserted therein and are slightly compressed into the notches of the vertical bar 55 which is fastened at top and bottom to the upper and lower inner frame members 25 and 25a. This arrangement holds the rails securely and at the same time permits of quick and easy replacement of the rails whenever necessary.

The stripping mechanism employed in our present machine being substantially like that proposed in our above mentioned application, Serial No. 531,812 has in practical field operation proved to be highly efficient in removing from the spindles at once the bulk of the cotton collected thereon at the picking side. This mechanism (shown especially in Figures 5 and 9) is simple in the extreme and includes primarily the series of horizontal stripping bars 56 and the rotating doffer 57 which operates in conjunction therewith, the former being supported at their front ends by the vertical member 58. The doffer is positioned vertically adjacent thereto and journaled to rotate as indicated.

A sprocket 59 at the upper end thereof connects by means of the chains 60 and 61 and the intermediate sprockets 62 and 63 with the sprocket 64 on the upper end of the shaft 11a which, through the main carrier sprocket 29 keyed thereon, is driven by the spindle carrier chain 30.

A further important feature likewise proposed in our last above mentioned application contributes essential characteristics for the satisfactory performance of the stripping mechanism described above. This feature resides in the hinging of the slats 32 at their connections with the spindle carrier chains, thus providing for the retarding or lagging action of the spindles as they pass in contact with the stripper bars. The combinative action of these elements thus arranged is for the continuous and effective removal of the cotton without bending the spindles, the cotton being gradually forced from the spindles by the diverging stripper bars as the spindles are carried forward by the endless spindle carrier. As the spindles reach the forward end of the stripper bars, the cotton is forced off the ends of the spindles, is doffed from the stripper bars by the rotating doffer 57 and dropped to the floor from which point it may be removed by any of various well known and approved conveying means to a suitable receptacle. For this purpose, we have shown a suction fan 65, the intake of which is connected by means of the suction pipe 66 with the suction chamber 67 adjacent the doffer, and the outlet of which leads thru discharge pipe 68 to a receptacle 69 (see Figures 1, 2, 3, and 5).

Figure 10:
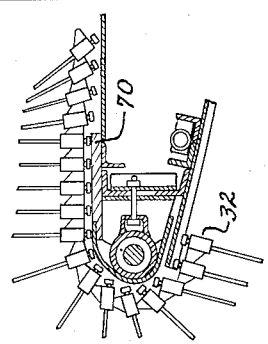
Figure 10 is a fragmentary view showing position taken by the spindle carrying slats as they pass around the rear of the elongated path.

By reference to Figures 5 and 10, it will be seen that the spindles do not lag just prior to their entrance into the stripping bars, but begin to lag only after their contact with the stripping bars begins. This action is desired for the purpose of bringing the rear ends of the stripper bars 56 as close as possible to the slats thus providing little opportunity for cotton that is wrapped on the spindles close to the slats to be missed by the stripper bars. A guide member 70 placed behind the spindle rollers (see Figure 10) serves to prevent lagging of the spindles during the short space traversed after passing around the rear sprockets prior to their entrance between the stripper bars. This effect from the guide members is made possible by the manner in which the axes of hinging of the slats are made offset from the axes of the slats themselves. It will be further observed in connection herewith that no means of reversal of the spindles is here provided, it having been found in practice that a certain amount of vibration of the slats and spindles invariably present at this portion of the path will loosen the cotton on the spindles sufficiently for its proper removal therefrom by the stripper bars.

As mentioned above, the weight of the spindle carrier at the picking side is conveniently carried by those members comprising the spindle driving means; but on the stripping side no such convenient supporting means is available in the regular operating elements otherwise required; hence, along this portion of the spindle carrier path, we provide a slide rail 71 (see Figures 12 and 13) to work in contact with the upper spindle carrier chain, said slide rail being supported by the horizontal angle bar 72 with one or more vertical bars 73 attached thereto, and connected by means of spring 74 to the frame member 24 and held in proper position by the cleats 75 secured to the upper and lower frame members 24 and 24a. The slide rail 71 may be made of any suitable material such as oil treated wood or the like which has a low coefficient of friction and good wearing qualities. Its location for contact with the upper chain avoids the entrance of any appreciable amount of dirt to the rubbing surfaces between the rail and the spindle carrier chain, as would inevitably occur at the lower chain. The wear between chain and rail will thus be reduced to a minimum, and whatever wear does occur will be largely compensated for by the spring 74, the tension of which may be adjusted when necessary by means of the adjusting screw 76.

Due to the close spacing of the spindles necessary to provide a high picking efficiency, there is invariably a certain amount of leaves, stems, etc., pulled from the stalks by the spindles during the picking operation and the subsequent withdrawal of the loaded spindles from the plants. If this trash is allowed to remain in the cotton picked until it reaches the gin, it becomes intermingled with the cotton and hence more difficult to separate and remove therefrom, and results in a final lowering of the grade. In order to separate out and eliminate as much as possible of this trash before it reaches the main storage receptacle and becomes mixed with the cotton therein, we provide an opening in the housing indicated at 77 (see Figure 5) thru which most of the trash so gathered will be discharged as it is thrown from the spindles. The separating tendencies, while the spindle carrier is making the short turn around the rear sprockets 28 and 28a are very effective due to the spreading apart of the vertical rows of spindles and to the centrifugal forces tending, at the relatively high speed of movement of the spindles in this position, literally to sling loose from the spindles everything carried therewith. This simple provision has been found by experience to eliminate a large percentage of all trash gathered, without at the same time losing any appreciable amount of the cotton carried by the spindles.

Another device provides for the further cleaning of the cotton, removing therefrom principally small trash and dirt. This device indicated generally 78 and shown more in detail in Figure 26 consists of a series of parallel rods of comparatively small diameter mounted at one end by a suitable member 78, one of which attaches to the outlet pipe from each fan or blower which conveys the cotton from the picking unit to the storage container 69. The spacing of the rods is such as to prevent the passage of any ordinary pieces of seed cotton therebetween, and at the same time, sufficient to permit small pieces of trash, dirt, etc., to fall or be blown thru. The general arrangement, it will be observed particularly from Figure 1, provides for vertically downward discharge of the cotton from the blower, against the sloping rods which direct the cotton into the cotton container but permit small trash, etc., to fall thru outside the container and drop to the ground. The particular containers illustrated in the drawings are of a simple form, and it is to be assumed that in practice any container that may be found most convenient for quick and easy disposal of the cotton therefrom will be employed.

Under ordinary operating conditions in the field, the regular stripping mechanism working in conjunction with the lagging smooth spindles are described herein and in our application, Serial No. 531,812, removes so nearly all of the cotton from every loaded spindle the first time it passes the stripping mechanism, that the extremely small percentage that sometimes remains on the spindle in the form of small wisps wrapped or partially wrapped about the spindle, presents no difficulty so that as the regular and efficient removal of the cotton from the spindles by the stripping mechanism is concerned. A difficulty which has arisen in connection therewith, however, is in the fact that these small wisps when left on the spindles will tend to remain thereon and because of successive moistening and rotating in contact with the cotton plants these wisps form wet and discolored rings which will sooner or later be forced off the spindles along with bolls of cotton which are subsequently wound about the same spindles and will be discharged into the cotton container along with the other cotton, thereby lowering the grade appreciably.

Particular attention is now directed to an auxiliary doffing device, Figure 15, which forms a very essential feature of our present invention. In its preferred embodiment this device consists of a series of wheel elements 79 arranged on the vertical hollow shaft 80 and positioned for rotation adjacent the path of the spindle carrier (see Figures 5, 15, and 16) whereby the horizontal rows of spindles carried by the spindle carrier will pass thru the openings between the wheels. On the rims of the wheels are secured the flexible bands 81 made from a suitable grade of rubber or like substance. Metal bands 82 are provided for holding flexible bands 81 in proper working position on the rims of wheels 79. In Figure 15, we illustrate one such arrangement which has been constructed and operated satisfactorily on a machine of this type. The flexible bands 81 are made slightly wider than the space between two adjacent horizontal rows of spindles, thus providing a mild pressure of the bands 81 against the spindles 35 passing therebetween.

As may be seen from Figure 5, the doffer wheels will tend to rotate due to the spindles passing in contact with the rims at one side thereof, and the linear peripheral speed of the wheels will be approximately equal to the speed of the spindle carrier. The resulting relative motion between the spindles and the flexible bands 81 of the rotating doffer wheels, as the spindles leave the wheels, is that of dragging straight off the spindles, which action is found to be most effective in removing small wisps of cotton that have been left on the spindles after they have passed the stripping members. The wisps removed from the spindles in this manner are discharged into the space inside the doffer wheels and dropped thru the opening 83 in the floor of the housing to the ground.

Figure 9:
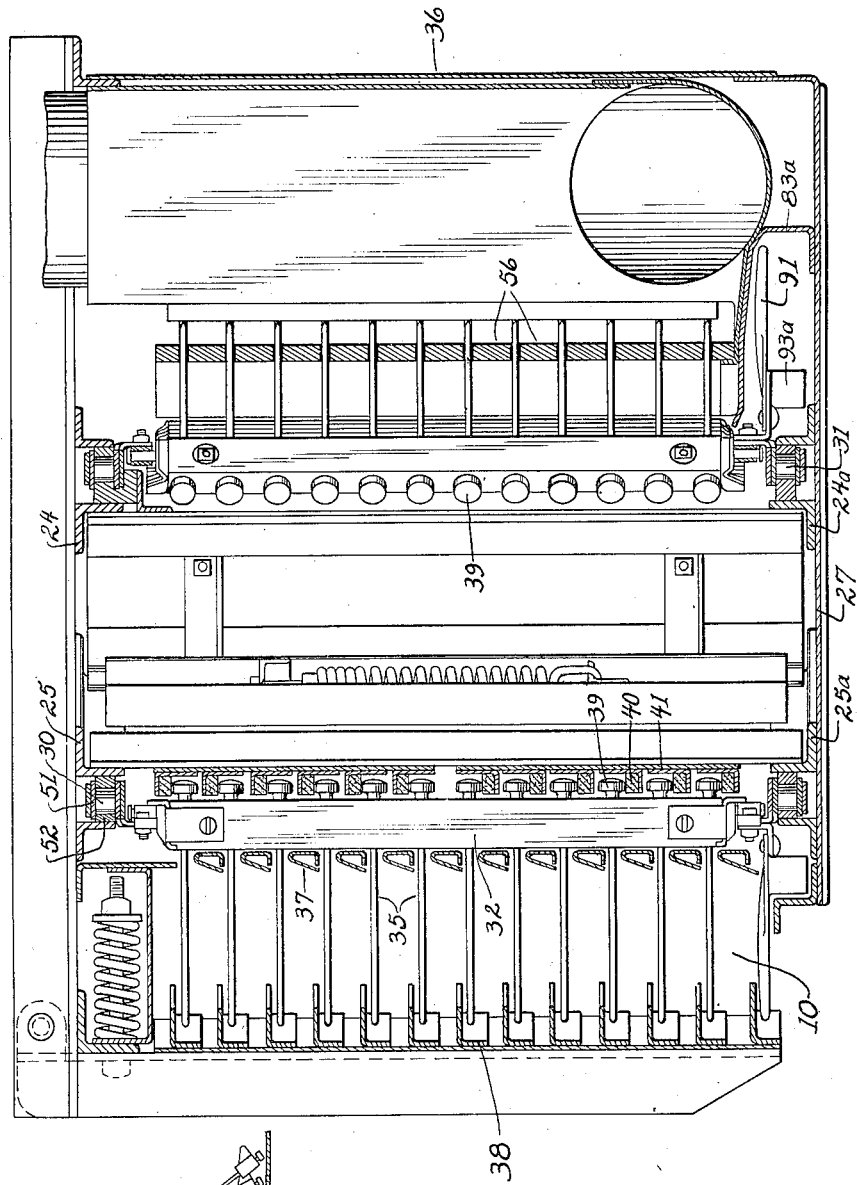
Figure 9 is a cross sectional view of a picking unit taken on line 9—9 of Figure 5 looking in the direction of the arrows.

In Figures 9 and 15, the false floor 83a, extending nearly the full length of the spindle carrier, serves as a partition between the spindles 35 and the spindle guards 91 and makes possible the delivery of the cotton to the suction chamber 67 without any possible interference from the spindle guards 91. A circular pan 83b resting on the false floor 83a serves to insure the dropping of the wisps of cotton thru the opening 83 in the housing.

In connection with the auxiliary doffer just described, there is provided a moistening device for applying liquid, preferably water, to the surface of the flexible doffing bands 81 which contact the spindles. This device includes a movable holder 84 with an opening thru which may project a fibrous or sponge material 85 contained in the main body thereof, and yielding means such as spring 86 arranged to press the holder and hence the fibrous material lightly against the surface of the flexible bands on the auxiliary doffer. Liquid is fed from a reservoir 87 thru pipe 88 to the fibrous material, which when thus saturated with liquid conveys a film of moisture to the surface of the flexible doffing bands moving in contact therewith. The action of the moisture thus introduced is to serve as a lubricant between the flexible bands 81 and the spindles 35 moving in contact therewith and hence reducing wear on the doffer bands.

Control of the flow of liquid to the moistening unit is effected by means of the valve 89 (Figure 1) placed in the feed line 88, and any surplus of liquid fed thereto, drains from the bottom of the moistening unit thru a suitable drain funnel 90 to the outside of the housing.

A further and very important function of the moisture applied to the doffing bands is that the bands are thus made to serve as moistening devices, supplying the necessary film of moisture to the surface of the smooth spindles which causes the fibers to adhere thereto and to be wound around the spindles when they are rotated in contact with the open cotton. Use of the above described device, therefore, eliminates the necessity for separate moistening devices for the spindles as was heretofore used and which served only the single purpose of applying moisture to the spindles.

It has been observed that the smooth surface type of spindle, having moisture applied thereto to cause adherence of the cotton fibers to the spindle, must be comparatively small in diameter to be highly effective in catching the cotton fibers. This limitation in the size of the spindles used requires not only that the spindles be made of un-breakable material, but, for continuity of operation with a machine of this type, it becomes necessary to provide means for protecting the spindles against bending due to abuse from certain conditions met in practice. When, for any reason, the endless spindle carrier is caused to move at a speed which results in relative movement between the spindles and any plant with which they may be in contact, as for example when turning at the ends of the rows or when the traction means skid perceptibly, some of the spindles near the bottom of the machine may by this action become bent. To overcome this difficulty, we propose a system of spindle guards (see Figures 5, 9, 11, 12, and 14) to be attached directly to the lower spindle carrier chain 31 and having prongs or fingers 91 projecting outwardly therefrom, there being one such prong located directly below and in line with each vertical row of spindles. These prongs will relieve the spindles of any strain produced by the above mentioned causes, and are themselves made sufficiently strong and stiff not to be bent by any condition ordinarily found in field operation. In the drawings we have shown one of the various forms in which these devices may be constructed. Referring to Figure 11, it will be seen that the prongs 91 are made in groups of four and are integral with a main body portion or web 92 which is pivotallly connected with the bracket 93 and slidably connected with the bracket 94, both brackets being secured by means of bolts to lugs 34 of the spindle carrier chain 31. The slidable connection between the web 92 and the slotted bracket 94 provides for the relative motion which occurs between these parts in passing around the sprockets 28 and 29. Bracket 93 carries a wing 93a which serves to prevent accumulation of dirt near the lower chain of the spindle carrier. Any dirt tending to accumulate near the chain track will be raked away by these wings and dropped through the opening 132 in the floor 27 of the housing as shown in Figure 5.

A further cause for the occasional bending of spindles when operating in fields where vines are present resides in the tendency of such vines to become entangled with the cotton and wound about the spindles; then as the spindles withdraw from the stalk at the rear of the picking space and pass from the picking side to the stripping side of the machine, the vine is carried with them. If the vine is too strong to break easily, the spindle may be bent before the vine is finally severed. By placing a sharp-edged cutting element in a suitable position, however, the vine will be pulled against the cutting edge and severed before enough pull to bend a spindle can be exerted thereagainst by the entangled vine. In Figures 5 and 22 we show our preferred embodiment of this device which comprises a single blade 95 suitably mounted in a vertical position to the bar 96. An alternative form of vine cutting device is shown in Figures 23 and 24 and comprises individual cutting elements 97 mounted on the rear sections 37a of the guards. With this arrangement each row of spindles is served by a cutting element.

Further safeguards are added to insure that no damage to any other part of the machine may result from the movements of a spindle which may become bent in spite of the above mentioned protective devices. These include the guide elements 98 and 99, respectively, (Figures 5, 7, and 8). The former, shown more in detail in Figure 7, is mounted on a vertical bar 58 and extends between horizontal rows of spindles to a point near the slats where each element is pointed, making it impossible to bend a spindle so much that it would fail to be guided by this means into the proper space between the rims of the auxiliary doffer. In Figure 8 the guide elements 99 are mounted adjacent the stalk guards 37 and extend between horizontal rows of spindles to a point near the slats, thus engaging any bent spindle near its bearing in the slat and guiding it into the proper space between the members 37. These members are formed and arranged for shedding falling dirt away from the spindle bearings and are suitably joined to rear sections 37a.

At the front end of the plant passage or picking tunnel 10, and working in conjunction therewith, is located a combination limb and low boll gatherer and row indicating device (see Figures 5 and 6). An oscillating crank assembly comprising the two arms 100 and 101 welded to the shaft 102 which is journaled to the frame at 103 has a pin 104 secured to the free end of arm 100 for supporting the boll gathering device, the weight of which is counterbalanced by means of the spring 106 attached to the free end of the arm 101 and to the frame of the picking unit near the floor. This mounting provides for limited movement of the gathering device both vertically and transversely with respect to the main body of the picking unit and thus permits the gatherer to follow the row of plants when the picking unit for any reason is caused to deviate in either direction from its proper path with respect to the row. The transverse movement of the gatherer is of a swinging nature due to its being pivoted on the pin 104 and the limit of this swinging is at the point of contact between the gatherer walls 107a and the forward portions of the tunnel walls 130 and 131 of the tunnel 10. The upward movement of the gatherer is likewise limited by its contact with the top or ceiling member of the picking tunnel 10 while the tension of the spring 106 may be so adjusted as to permit the gatherer to reach as low a position as may be found desirable in practice. At the bottom of the gatherer are the gathering rods 107 and the steadying rods 108 extending backward into the picking tunnel (see Figure 6). The rods 107 rise slightly as they extend rearwardly and serve to raise extremely low lying bolls of cotton up to within reach of the picking means. Foot pieces or slide elements 109 at the bottom on each side of the gatherer permit it to run against the ground and thereby increase its efficiency in picking up the low bolls.

By means of a pointer 110 attached to the frame of the gatherer, this device is made to serve the further useful purpose of indicating to the driver when the picking unit is deviating from its proper path with respect to the row. A stationary marker 111 secured to the unit frame (see Figures 2 and 6) assists the operator in observing the amount and direction of movement of the pointer, and thus enables him more easily to steer the machine in the proper path. Attention is called here to the difficulty the operator may have in seeing how well the machine is following the row. The row indicating device proposed here has been tested in practice and is believed to possess distinct advantages in machines of the type here concerned. Painting the pointer and the stationary marker with conspicuous contrasting colors is obviously desirable. Rods 108 extend rearwardly for contacting two or more stalks simultaneously producing a steadying effect upon the row indicator. Where automatic steering devices are used as proposed elsewhere herein, the indicating feature of this device may be relied upon largely to warn the operator in case the automatic steering device for any reason fails to guide the machine in its proper course on the rows.

Figure 3:
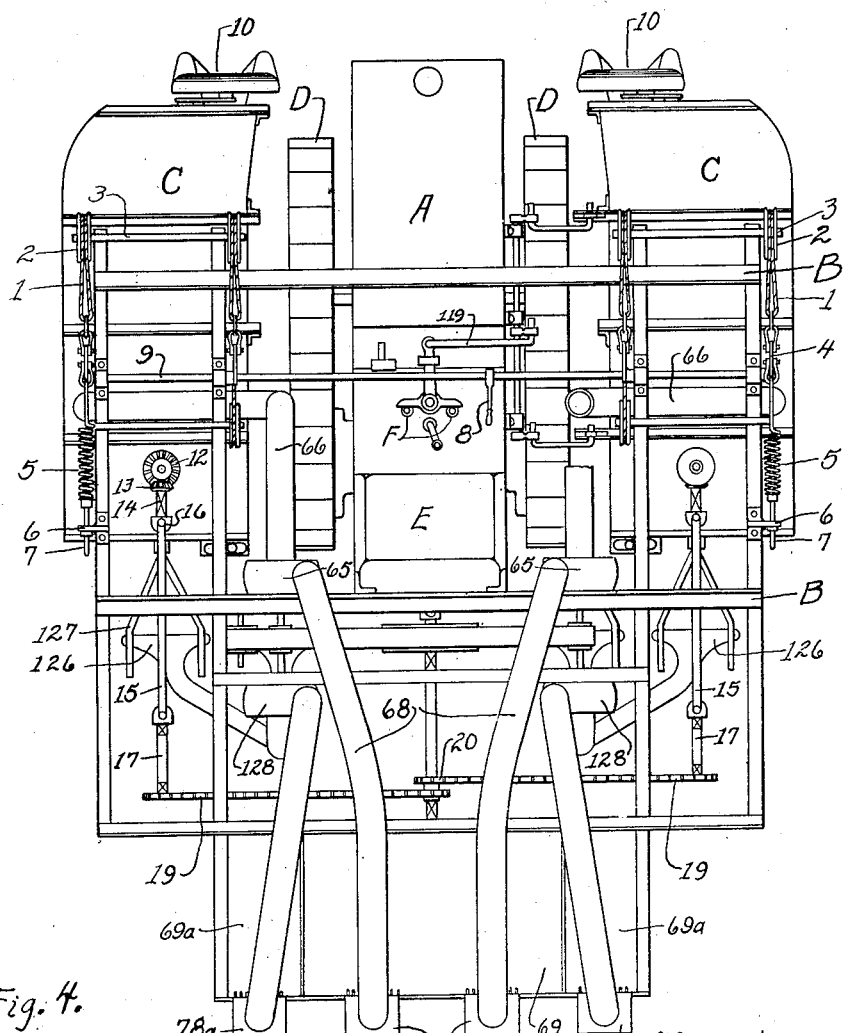
Figure 3 is a plan view thereof.
Figure 4:
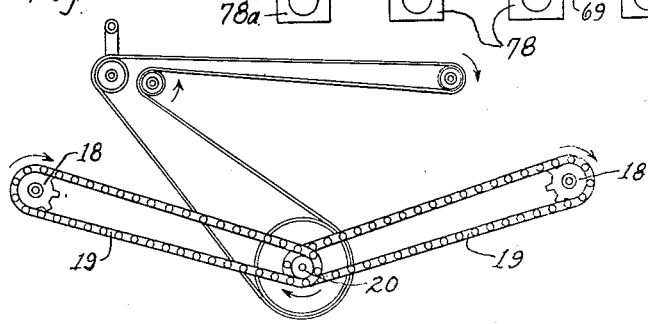
Figure 4 is a diagrammatic view of the chain and belt drives for the picking units and suction devices respectively, as viewed from the rear of machine.

It is evident that if the picking units be allowed freely to move transversely of the row, such an arrangement will take care of a certain amount of variation in spacing of rows, and, if reasonable care has been exercised in the planting, it will be possible to operate on any pair of rows without injuring the stalks. In order to obtain this characteristic of flexibility, it is necessary merely to omit any lateral holding means for the free floating unit except such as may be required for control of the unit when traveling over uneven ground or between different fields, etc. Any suitable means may be used for this purpose. Longitudinal oscillation of the picking unit is prevented by stay bar 105 co-acting with slotted bracket 112 as shown in Figures 1 and 3.

We will now consider the control of the machine when in operation. With particular reference to Figures 2 and 3, it is evident that due to the suspension of the picking units on the cables 1, the units are thereby free to swing toward or away from the tractor body within limits such as may be provided therefor. It is further evident that as the machine is driven over the rows with a number of the plants engaging the walls of the picking tunnel as previously described, the picking unit will tend to remain in its proper position following the row even where the tractor may deviate slightly from its proper course. The resultant transverse motion between the tractor and either of the picking units may, therefore, be utilized to obtain automatic steering for the machine as a whole. The mechanism proposed for this purpose is illustrated in Figure 27.

A shaft 113 journaled in the mounting brackets 114 secured to the tractor frame at suitable points, carries keyed thereon the arms 115 and 116, the arms being flexibly connected by means of the links 117 to brackets 118 secured to the unit cross frame members 26, and the arm 116 being connected by means of the link 119 to the end of arm 120, the opposite end of which is pivotally mounted on the pin 121 carried by the bracket 122 suitably secured to the floor or frame of the tractor.

The arm 123 pivoted on pin 121 adjacent to arm 120 carries the short steering arms 124 which engage the steering levers F and also engages by means of the slidable locking element 125 at its free end with the arm 120. Any deviation of the tractor toward or away from the unit so connected will actuate one or the other of the steering levers F and hence will guide the tractor to the right or to the left accordingly as it tends to travel too far to the left or right, respectively.

The slidable element 125 which serves to lock together the two arms 120 and 123 may be pushed forward to release arm 123 from arm 120, thus permitting manual control for turning at the ends of rows and for raising the picking units to extreme high position without interference from the automatic steering device. The steering controls thus arranged will provide for self-steering of the machine practically without attention from the operator except to turn around at the ends of rows. The operator is thereby freed from the fatigue and drudgery of constant manual steering.

In Figures 1 and 3 is shown a suction means for picking up cotton from the ground. The suction nozzles 126 at the rear of the unit are attached to slide bars 127 which slide on the ground and carry the nozzles of the suction pipe the proper distance therefrom to pick up any loose cotton that may be on the ground; the suction is created by fan 128 which discharges the cotton into the container 69a. By this means it will be possible not only to harvest the cotton from the stalk, but to salvage any cotton that may have fallen onto the ground, thus providing a mechanical cotton harvester which will do the job fully as well as can be done by hand. The rope 129 serves to lift the slide bars 127 when the picking unit C is raised, flexible sections are provided in the suction pipes to take care of this movement.

From the foregoing, it will be seen that as the machine is passed over the rows of cotton the tractor will travel astraddle of one row, the units picking the two rows adjacent thereto. The cotton stalks enter the picking mechanism thru the boll gathering device, the mouth of which is designed to avoid pulling off bolls. The gathering rods of said device raise the lower bolls up into the picking space where all the open bolls are contacted by the spindles, which, having been previously moistened, are rotated as they travel backward at approximately the same speed the machine travels forward. The stalk shield 38 presses the stalks and bolls into the spindles and the open cotton is wrapped about the spindles which are then gradually withdrawn from the plants by means of the curved track of the spindle carrier. The rear sections of the stalk guards 37a hold the stalks in place as the cotton loaded spindles are withdrawn therefrom. Any vines which may have been wrapped up with the cotton will be severed by the vine cutting means 95 at the rear end of the picking unit just inside of the stalk guards, thus preventing bending of spindles and causing a minimum of vines to be carried along with the cotton. As the spindles swing around the rear sprockets 28, they throw loose from themselves the bulk of any trash gathered from the stalk and the trash is discharged through the opening 77 in the floor of the housing to the ground. The spindles then pass between the stripper bars 56 and the cotton is stripped from them. The doffer 57 rotates rapidly near the front end of the stripping bars and insures the delivery of the cotton to the suction box 67 from whence it is delivered by the fan 65 to the screen 78 where further cleaning takes place just before the cotton is delivered to the container 69. The spindles now leave the stripping bars and enter the guides 98 which guide them positively into the spaces between the wheels 79 of the auxiliary doffer (Figure 15) which rotates by means of its contact with the spindles and in parting with the spindles it drags off all particles or wisps of cotton which may have been left thereon by the stripping means. The flexible bands 81 of the doffing wheels are moistened by the liquid soaked sponges 85 working in contact therewith. By this means, the spindles are automatically moistened and cleaned and kept in perfect picking condition. The spindles now pass from the auxiliary doffer and around the sprockets 39 at the front end of the picking unit and again enter the picking tunnel through the spaces between the stalk guards 37, being positively guided thereto by the guiding elements 99, and thus the cycle of operation is completed.

Simultaneously with the operation of the picking units as outlined above, the suction fans 128 are picking up, through the salvage nozzles 126, any cotton that may have fallen onto the ground and blowing it against the screen 78a which deflects the cotton into the cotton container 69a, from whence it is removed at convenient intervals. The steering of the machine may be accomplished either automatically or by hand.

The self-propelled two row machine described herein is our preferred embodiment of this invention but we desire it to be understood that our picking units may be mounted and powered in any suitable manner, either singularly or plurally. It is thought from the foregoing description that the advantages and novel features of our invention will be apparent. We desire it to be understood that we may make changes in the construction and in the combination and arrangement of the several parts provided that such changes fall within the scope of the appended claims.

Having described our invention, what we claim is:

1. A self-propelled cotton picker comprising a pair of cotton picking units and a track type tractor, one picking unit mounted at each side thereof, the tracks being spaced to span one row of cotton and the picking units spaced to pick the rows of cotton adjacent thereto and means for driving the mechanism of said picking units by the power of the tractor.

2. A self-propelled cotton picker comprising a pair of cotton picking units and a track type tractor having tracks spaced to span one cotton row and one picking unit mounted at each side thereof and spaced to pick the rows of cotton adjacent thereto, said picking units being mounted to said tractor by transversely movable means whereby the units will follow the rows to some extent independently of the course of the tractor, and means for driving the cotton picking mechanism by the power of the tractor.

3. A self-propelled cotton picker comprising a pair of cotton picking units and a track type tractor having tracks spaced to span one cotton row and one picking unit mounted at each side thereof and spaced to pick the rows of cotton adjacent thereto, said picking units being mounted to said tractor by transversely movable means whereby the picking units will follow the cotton rows to some extent independent of the course of the tractor and means for connecting the said picking units with the steering apparatus of the tractor for automatically steering the said tractor in its proper course along the rows, and means for driving the cotton picking mechanism by the power of the tractor.

4. In a cotton picking machine comprising a plurality of smooth surfaced picking spindles, means for rotating the spindles while in the picking position, means for stripping cotton from the spindles; means for removing wisps of cotton from the spindles which may have been left thereon after said spindles have passed by the stripping means.

5. In a cotton picking machine comprising a plurality of smooth surfaced picking spindles, means for rotating the spindles while in the picking position, means for stripping cotton from the said spindles, means for doffing cotton from the stripping means and an auxiliary doffer for removing wisps of cotton from the spindles which may have been left thereon by the stripping means.

6. In a cotton picking machine comprising a plurality of picking spindles, means for rotating said spindles, means for stripping the cotton from said spindles, means for removing wisps from said spindles subsequent to the passing of the spindles through the stripping means, said wisp removing means comprising a series of wheels having flexible bands around the rims thereof, and means for applying liquid to said flexible bands.

7. In a cotton picking machine comprising a plurality of picking spindles, means for rotating the spindles, means for stripping the cotton from said spindles, means for removing wisps from said spindles subsequent to the passing of the spindles through the stripping means, said wisp removing means comprising a series of wheels having flexible bands around the rims thereof, and means for guiding spindles from the stripping mechanism into proper contact with the said means for removing wisps.

8. In a cotton picking machine comprising a plurality of picking spindles, means for rotating said spindles, means for stripping the cotton from said spindles and a plurality of prong like spindle guards positioned below the spindles and projecting radially approximately in line with the vertical rows of said spindles.

9. In a cotton picking machine comprising a plurality of picking spindles, means for rotating the spindles, means for removing the cotton from said spindles and means for cutting any vines that may become entangled with said spindles as the machine is drawn over the cotton rows.

10. In a cotton picking machine comprising a plurality of picking spindles, means for rotating said spindles, means for stripping the cotton from the spindles, and a plurality of stalk guards triangularly shaped and positioned longitudinally of the machine between horizontal rows of spindles for shedding the cotton and any falling dirt away from the spindle bearings substantially as described.

11. A cotton picking machine having a picking side and a stripping side, comprising an endless traveling member, an endless track for said member arranged longitudinally of the machine, means for imparting movement to said endless traveling member, a plurality of rows of spindles carried by said endless member, a roller on the inner end of each spindle carried by said endless member, a plurality of friction drive elements, means for holding said friction drive elements in contact with the rollers of each horizontal row of spindles for producing rotation thereof, and means for holding said resilient friction drive elements at the front end thereof, reinforcing means provided integrally with said resilient elements providing them with the necessary tensile strength.

12. A cotton picking machine having a picking side and a stripping side, comprising an endless traveling member, an endless track for said member arranged longitudinally of the machine, means for imparting movement to said endless member, a plurality of rows of spindles carried by said endless member, self adjusting suspension means for carrying the weight of said endless member at the stripping side of the machine, said last named means comprising a spring supported member positioned below and slidably contacting the upper chain of said endless member substantially as described.

13. A cotton picking machine having a picking side and stripping side, comprising an endless traveling member, an endless track for said member arranged longitudinally of the machine, means for imparting movement to said endless member, a plurality of rows of spindles carried by said endless member, and a rain proof housing for said machine and an opening provided in the floor of said housing at the rear of the machine through which trash is discharged from the spindles of said machine.

14. A cotton picking machine having a picking side and stripping side, comprising an endless traveling member, an endless track for said member arranged longitudinally of the machine, means for imparting movement to said endless member, a plurality of rows of spindles carried by said endless member, said track being outwardly bowed at the picking side of the machine and substantially flat at stripping side thereof, spaced longitudinally extending guide elements at the picking side between which the spindles pass, a shield carried by the picking side of the machine and forming with the guide elements a longitudinally extending passage for receiving the plants as the machine travels along, an intermediate portion of the shield being bowed outwardly to conform to the bowed part of the track, a series of fin like elements carried by said shield arranged longitudinally thereon spaced one fin between each horizontal row of spindles, said fins acting to force the cotton onto the spindles and preventing the twising of the fiber between the ends thereof and at the same time providing clearance for dead stalks and the like to pass between said fins.

15. In mounting mechanism for cotton picking machines, means for mounting one or more cotton picking units on a tractor or other carrying structure in a transversely movable manner whereby the picking unit or units will freely follow the rows of cotton to some extent independently of said carrying structure, and a boll lifting and limb gathering device projecting forwardly of the unit and mounted for vertical and lateral movement with respect to the remainder of the unit.

16. In combination, a cotton picking machine having a picking mechanism and a housing with a plant receiving tunnel, a combination boll lifting and limb gathering device projecting from the mouth thereof, said device being mounted pivotally with respect to the picking mechanism and housing and so constructed that it will freely follow the row and surface of the ground to some extent independently of the course followed by the cotton picking machine and gather the spreading limbs of the cotton plant and lift the lower bolls into the mouth of said plant receiving tunnel whereby all the open bolls will be contacted by the picking mechanism.

17. In combination, a cotton picking machine comprising a picking mechanism and a housing with a plant receiving tunnel, a boll lifting and limb gathering device projecting from the mouth thereof, said device being mounted pivotally with respect to the picking mechanism and housing and so constructed that it will freely follow the row and surface of the ground to some extent independently of the course followed by the cotton picking machine, and an upright arm attached rigidly to the boll lifting and limb gathering device and being so constructed that it will indicate to the driver the course the machine should follow on the row.

18. In combination, a cotton harvesting machine and suction means comprising a pair of nozzles attached to slide bars which slide on the ground carrying the nozzles the proper distance therefrom to pick up any loose cotton that may be on the ground, a suction fan and pipe for conveying the cotton to a cotton container.

19. A self-propelled cotton picker comprising a pair of cotton picking units and a track type tractor having tracks spaced to span one cotton row and one picking unit mounted at each side thereof and spaced to pick the rows of cotton adjacent thereto, said picking units being mounted to said tractor by transversely movable means whereby the units will follow the rows to some extent independently of the course of the tractor, said picking units including a boll lifting and limb gathering device projecting forwardly of the machine and mounted for pivotal movement with respect to the remainder of the unit, and means for driving the cotton picking mechanism by the power of the tractor.

20. A self-propelled cotton picker comprising a pair of cotton picking units and a tractor having traction elements spaced to span one cotton row, a picking unit mounted at each side of the tractor and spaced to pick the rows of cotton adjacent thereto, said picking units being mounted to said tractor by transversely movable means whereby the units will follow the rows to some extent independently of the course of the tractor, a boll lifting and limb gathering device projecting forwardly of the machine in advance of each picking unit, and means for pendently supporting said device to swing laterally.

21. A self-propelled cotton picker comprising a pair of cotton picking units and a tractor having traction elements spaced to span one cotton row, a picking unit mounted at each side of the tractor and spaced to pick the rows of cotton adjacent thereto, said picking units being mounted to said tractor by transversely movable means whereby the units will follow the rows to some extent independently of the course of the tractor, a boll lifting and limb gathering device projecting forwardly of the machine in advance of each picking unit, and means for pendently supporting said device to swing laterally and to rise and fall vertically.

22. A self-propelled cotton picking comprising a pair of cotton picking units and a tractor having traction elements spaced to span one cotton row, a picking unit mounted at each side of the tractor and spaced to pick the rows of cotton adjacent thereto, said picking units being mounted to said tractor by transversely movable means whereby the units will follow the rows to some extent independently of the course of the tractor, a boll lifting and limb gathering device projecting forwardly of the machine in advance of each picking unit, means for pendently supporting said devices to swing laterally and to rise and fall vertically, and means to counterbalance the weight of said devices and to hold them normally at a predetermined distance from the ground.

23. In mounting mechanism for cotton picking machines, means for mounting at least one cotton picking unit on a carrying structure in a transversely movable manner whereby the unit will freely follow the rows of cotton to some extent independently of said carrying structure, a boll lifting and limb gathering device projecting forwardly of the unit, and means for supporting said device in a counterbalanced condition free to rise and fall.

24. In mounting mechanism for cotton picking machines, means for mounting at least one cotton picking unit on a carrying structure in a transversely movable manner whereby the unit will freely follow the rows of cotton to some extent independently of said carrying structure, a boll lifting and limb gathering device projecting forwardly of the unit, means for supporting said device in a counterbalanced condition to rise and fall, and means for pivotally mounting said device on said supporting means for lateral swinging motion.

25. In a cotton picking machine comprising a plurality of picking spindles, means for rotating said spindles, means for stripping the cotton from said spindles, means for removing wisps from said spindles subsequent to the passing of the spindles through the stripping means, said wisp removing means comprising a series of wheels having flexible bands around the rims thereof between which bands the spindles are passed.

26. In a cotton picking machine, a picking mechanism including traveling picking spindles and a stripping mechanism for doffing the spindles of their gathered cotton masses, and an auxiliary doffer for removing wisps of cotton from the spindles which may have been left thereon by the stripping mechanism.

27. In a cotton picking machine, a picking mechanism including traveling picking spindles and a stripping mechanism for doffing the spindles of their gathered cotton masses, an auxiliary doffer for removing wisps of cotton from the spindles which may have been left thereon by the stripping mechanism, said auxiliary doffer comprising a series of superposed horizontally rotatable wheels having peripheral elements to engage the spindles, and means for passing the spindles through the auxiliary doffer between the wheels thereof and in cooperative relation to said peripheral elements.

28. In a cotton picking machine, a plurality of picking spindles, means for causing said spindles to gather the cotton from the plant, means for doffing the gathered cotton from the spindles, an auxiliary doffer for removing wisps from said spindles subsequently to the action of said means for doffing, and means for guiding said spindles from said means for doffing into proper cooperative relation to said auxiliary doffer.

29. In a cotton picking machine, a plurality of picking spindles, means for causing said spindles to gather the cotton from the plant, means for doffing the gathered cotton from the spindles, an auxiliary doffer for removing wisps from said spindles subsequently to the action of said means for doffing, means for guiding said spindles from said means for doffing into proper cooperative relation to said auxiliary doffer, and said auxiliary doffer comprising a series of wheels having flexible bands at their peripheries, between which bands the spindles are passed, and said guiding means comprising rigidly mounted guiding elements located adjacent said auxiliary doffer.

30. In a cotton picking machine, a plurality of picking spindles, means for rotating said spindles, means for stripping cotton from said spindles, and means cooperatively associated with the spindles for engaging the plants as the spindles operate thereon, for guarding the spindles against bending forces.

31. In a cotton picking machine comprising a plurality of picking spindles, means for rotating said spindles, means for stripping the cotton from the spindles, and a plurality of stalk guards positioned longitudinally of the machine between horizontal rows of spindles for shedding the cotton and any falling dirt away from the spindle bearings substantially as described.

32. A cotton picking machine having a picking side and a stripping side comprising an endless traveling member, an endless track for said member arranged longitudinally of the machine, means for imparting movement to said endless traveling member, a plurality of rows of spindles carried by said endless member, a plurality of friction drive elements, means for holding said friction drive elements in contact with the spindles of each horizontal row of spindles to produce rotation thereof, and means for holding said friction drive elements at the front end thereof.

33. A cotton picking machine having a picking side and a stripping side, comprising an endless traveling member, an endless track for said member arranged longitudinally of the machine, means for imparting movement to said endless traveling member, a plurality of rows of spindles carried by said endless member, a spindle rotating surface on the inner end of each spindle carried by said endless member, a plurality of friction drive elements, means for holding said friction drive elements in contact with the rotating surface of each horizontal row of spindles for producing rotation thereof, and means for holding said friction drive elements at the front end thereof.

34. A cotton picking machine having a picking side and a stripping side, comprising an endless traveling member, an endless track for said member arranged longitudinally of the machine, means for imparting movement to said endless member, a plurality of rows of spindles carried by said endless member, self-adjusting suspension means for carrying the weight of said endless member at the stripping side of the machine, said last named means comprising a resilient device slidably contacting the upper chain of said endless member.

35. In combination with a tractor and a cotton picking unit mounted on each side thereof to move laterally for purposes described, of boll lifting and limb gathering devices projecting forwardly of each unit, and means for floatingly mounting said devices on their respective units.

36. In combination with a tractor and a cotton picking unit mounted on each side thereof to move laterally for purposes described, of boll lifting and limb gathering devices projecting forwardly of each unit, and means to mount said devices on the respective units for movement in a vertical direction and in a lateral direction.

37. In a cotton picking machine, an endless carrier, spindle carrying slats mounted hingedly on said carrier, said machine having a picking side and a stripping side, stripping means including bars at the stripping side for removing the cotton masses from the spindles, said spindles being mounted to lag as they pass through the stripping means, and means adjacent the place where the spindles enter the stripping means for holding the spindles against lagging until they shall have come into contact with the stripping bars.

38. In a cotton picking machine, an endless spindle carrier including upper and lower chains, slats pivoted to said chains to swing on vertical axes, picking spindles mounted on said slats, upper and lower chain tracks, means carried by the lower chain for raking detritus away from said lower chain track to an opening in the machine.

39. In a cotton picking machine, an endless spindle carrier including upper and lower chains, slats pivoted to said chains to swing on vertical axes, picking spindles mounted on said slats, upper and lower tracks, means carried by the lower chain for raking detritus away from said lower chain track to an opening in the machine, and a set of spindle guard members carried by said lower chain.

40. In a cotton picking machine, a plurality of picking spindles, means for causing said spindles to gather the cotton from the plants, means for doffing the gathered masses of cotton from the spindles, and a moving auxiliary doffer for removing wisps from the spindles subsequent to the action of said means for doffing.

41. In a cotton picking machine, a plurality of picking spindles, means for causing said spindles to gather the cotton from the plants, means for doffing the gathered masses of cotton from the spindles, and an auxiliary doffer for removing wisps from the spindles subsequent to the action of said means for doffing, said auxiliary doffer comprising a series of rotatable wheel elements spaced apart vertically, and having flexible bands rotating with the peripheries of said wheel.

42. A self-propelled cotton picker comprising a track type tractor, a cotton picking unit mounted at one side thereof, the tracks being spaced to span one row of cotton and the picking unit being spaced to pick a row of cotton adjacent thereto, and means for driving the mechanism of said picking unit by the power of the tractor.

43. A self-propelled cotton picker comprising a track type tractor, a cotton picking unit mounted at one side thereof, the tracks being spaced to span one row of cotton and the picking unit being spaced to pick a row of cotton adjacent thereto, means for driving the mechanism of said picking unit by the power of the tractor, said picking unit being mounted on said tractor by transversely movable means whereby the unit will follow the row to some extent independently of the course of the tractor.

44. A self-propelled cotton picker comprising a track type tractor, a cotton picking unit mounted at one side thereof, the tracks being spaced to span one row of cotton and the picking unit being spaced to pick a row of cotton adjacent thereto, means for driving the mechanism of said picking unit by the power of the tractor, said picking unit being mounted on said tractor by transversely movable means whereby the unit will follow the row to some extent independently of the course of the tractor, and means for connecting the said picking unit with the steering apparatus of the tractor for automatically steering the tractor in its proper course along the rows.

45. A cotton picking machine having a picking side and a stripping side, an endless traveling member, tracks for said member arranged longitudinally of the machine, means for imparting movement to said endless member, a plurality of vertical rows of spindles carried by said endless member, means for causing said spindles to gather cotton from the plants, means for doffing the gathered masses of cotton from the spindles, a plurality of prong-like elements carried below the spindles and each prong projecting laterally approximately in line with a vertical row of spindles when in the picking position.

46. A cotton picking machine having a picking side and stripping side, an endless traveling member, tracks for said member arranged longitudinally of the machine, means for imparting movement to said endless member, a plurality of vertical rows of spindles carried by said endless member, means for causing said spindles to gather cotton from the plants, means for doffing the gathered masses of cotton from the spindles, a plurality of prong-like elements carried below the spindles and projecting laterally approximately in line with the vertical rows of said spindles while in the picking position, for preventing bending of spindles by cotton stalks and the like, said prong-like elements being made in groups of at least two for purposes of strengthening said prongs and holding same securely in line with the vertical rows of spindles.

47. In a cotton picking machine, an endless carrier, vertical elements pivotally mounted on said carrier, spindles journaled in said elements, means for causing said spindles to gather cotton from the plants, means for doffing the gathered masses of cotton from the spindles and a revolving auxiliary doffer for removing wisps of cotton from the spindles subsequent to the action of said means for doffing.

48. In a cotton picking machine, an endless carrier, vertical elements pivotally mounted on said carrier, smooth surfaced spindles journaled in said elements, means for causing said spindles to gather cotton from the plants, means for doffing the gathered masses of cotton from the spindles, and an auxiliary doffer for removing wisps of cotton from the spindles subsequent to the action of said means for doffing, said auxiliary doffer comprising a series of rotatable wheel elements spaced apart vertically and having flexible bands rotating with the peripheries of said wheel elements.

49. In a cotton picking machine, an endless carrier, a plurality of spindles journaled in said carrier, means for causing said spindles to gather cotton from the plants, means for doffing the gathered mass of cotton from the spindles, a rain proof housing for said machine, and an opening provided in said housing at the rear of the machine through which trash is discharged from the spindles of said machine.

50. In a cotton picking machine comprising a plurality of picking spindles, means for rotating the spindles while in the picking position, means for stripping cotton from the spindles, revolving means for removing wisps of cotton from the spindles which may have been left thereon after said spindles have passed by the stripping means.

51. In a cotton picking machine comprising a plurality of picking spindles, means for rotating the spindles while in the picking position, means for stripping cotton from the said spindles, means for doffing cotton from the stripping means, and a moving auxiliary doffer for removing wisps of cotton from the spindles which may have been left thereon by the stripping means.

52. In a cotton picking machine, an endless carrier, vertical elements pivotally mounted on said carrier, spindles journaled in said elements, means for causing said spindles to gather cotton from the plants, means for doffing the gathered masses of cotton from the spindles, and a revolving auxiliary doffer for removing wisps of cotton from the spindles subsequent to the action of said means for doffing.

JOHN D. RUST.
MACK D. RUST.